United States Patent [19]

Shepard et al.

[11] Patent Number: 5,140,144

[45] Date of Patent: * Aug. 18, 1992

[54] SCAN BOARD MODULE FOR LASER SCANNERS

[75] Inventors: Howard M. Shepard, Great River; Yuri Gofman, Brooklyn; Edward Barkan, South Setauket, all of N.Y.

[73] Assignee: Symbol Technologies, Inc., Bohemia, N.Y.

[*] Notice: The portion of the term of this patent subsequent to May 14, 2008 has been disclaimed.

[21] Appl. No.: 667,674

[22] Filed: Mar. 11, 1991

Related U.S. Application Data

[63] Continuation of Ser. No. 484,170, Feb. 23, 1990, Pat. No. 5,015,833, which is a continuation of Ser. No. 429,198, Oct. 30, 1989, abandoned, which is a continuation-in-part of Ser. No. 265,548, Nov. 1, 1988, Pat. No. 4,896,026.

[51] Int. Cl.⁵ .............................................. G06K 7/10
[52] U.S. Cl. .................................. 235/472; 235/462; 235/467
[58] Field of Search ................. 235/472, 470, 467, 462

[56] References Cited

U.S. PATENT DOCUMENTS

| | | | |
|---|---|---|---|
| 4,460,120 | 7/1984 | Shepard et al. | 235/472 |
| 4,560,862 | 12/1985 | Eastman et al. | 235/467 |
| 4,766,298 | 8/1988 | Meyers | 235/470 X |
| 4,820,911 | 4/1989 | Arackellian et al. | 235/467 |
| 4,896,026 | 1/1990 | Krichever et al. | 235/472 |
| 4,939,356 | 7/1990 | Rando et al. | 235/467 |
| 5,015,833 | 5/1991 | Shepard et al. | 235/472 |

*Primary Examiner*—David Trafton
*Attorney, Agent, or Firm*—Kirschstein, Ottinger, Israel & Schiffmiller

[57] ABSTRACT

A scan board module includes a printed circuit board on which optical and scanning components are mounted in an optically-aligned relationship. The module is mountable in hand-held heads and protected from damage due to external shock by shock mounts, or in workstations which are either directly of indirectly connected to a cash register-type terminal or hand-held terminal.

21 Claims, 7 Drawing Sheets

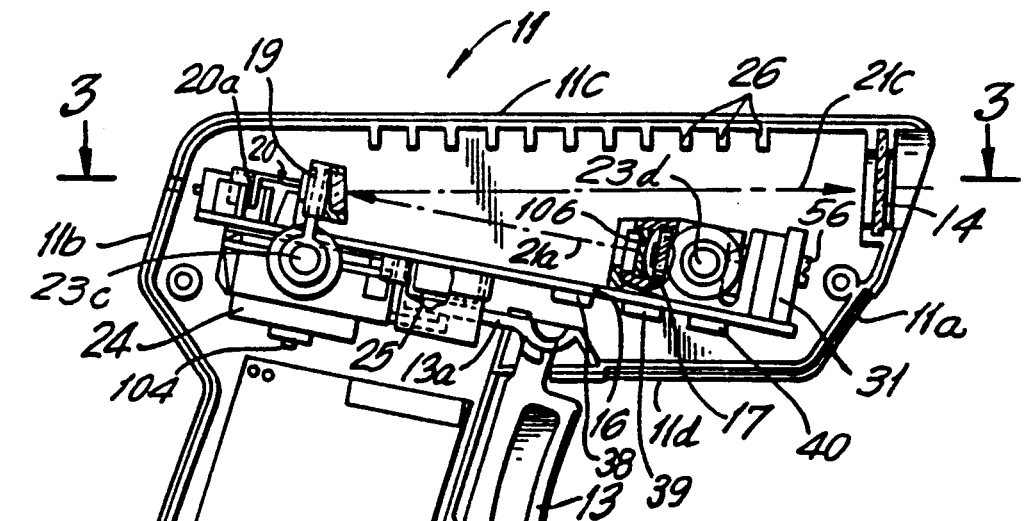
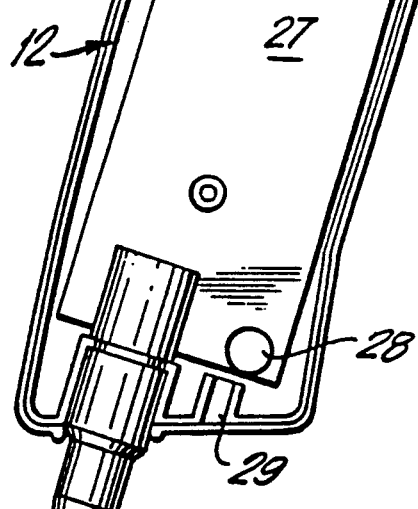
FIG. 2
FIG. 3
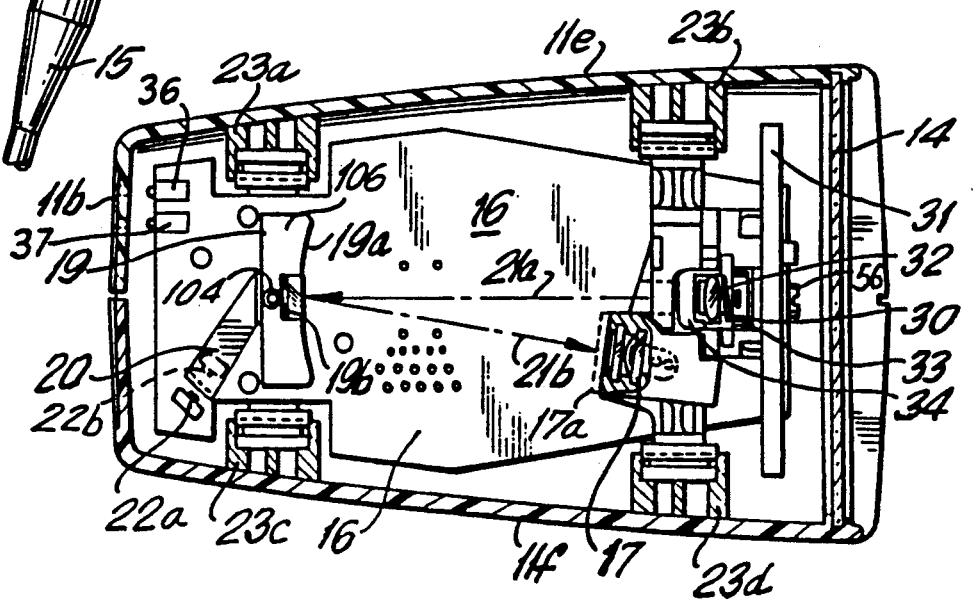

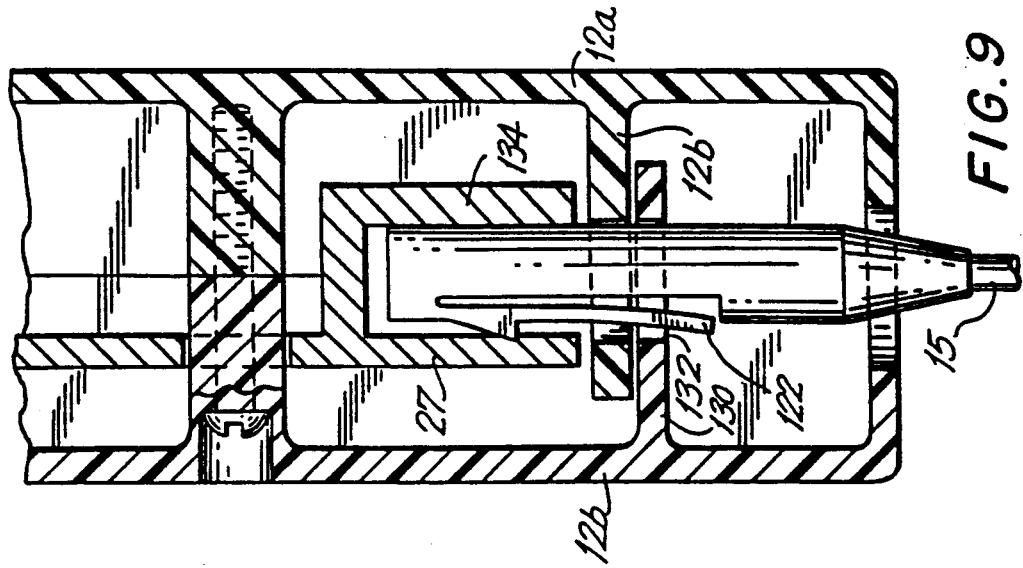
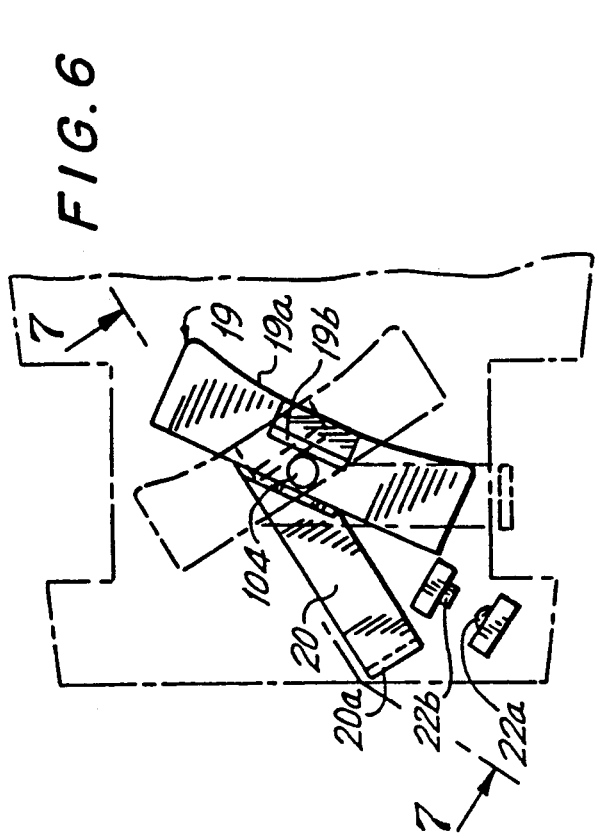
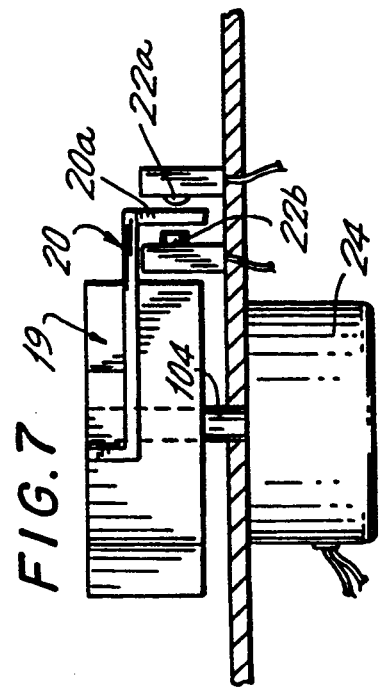

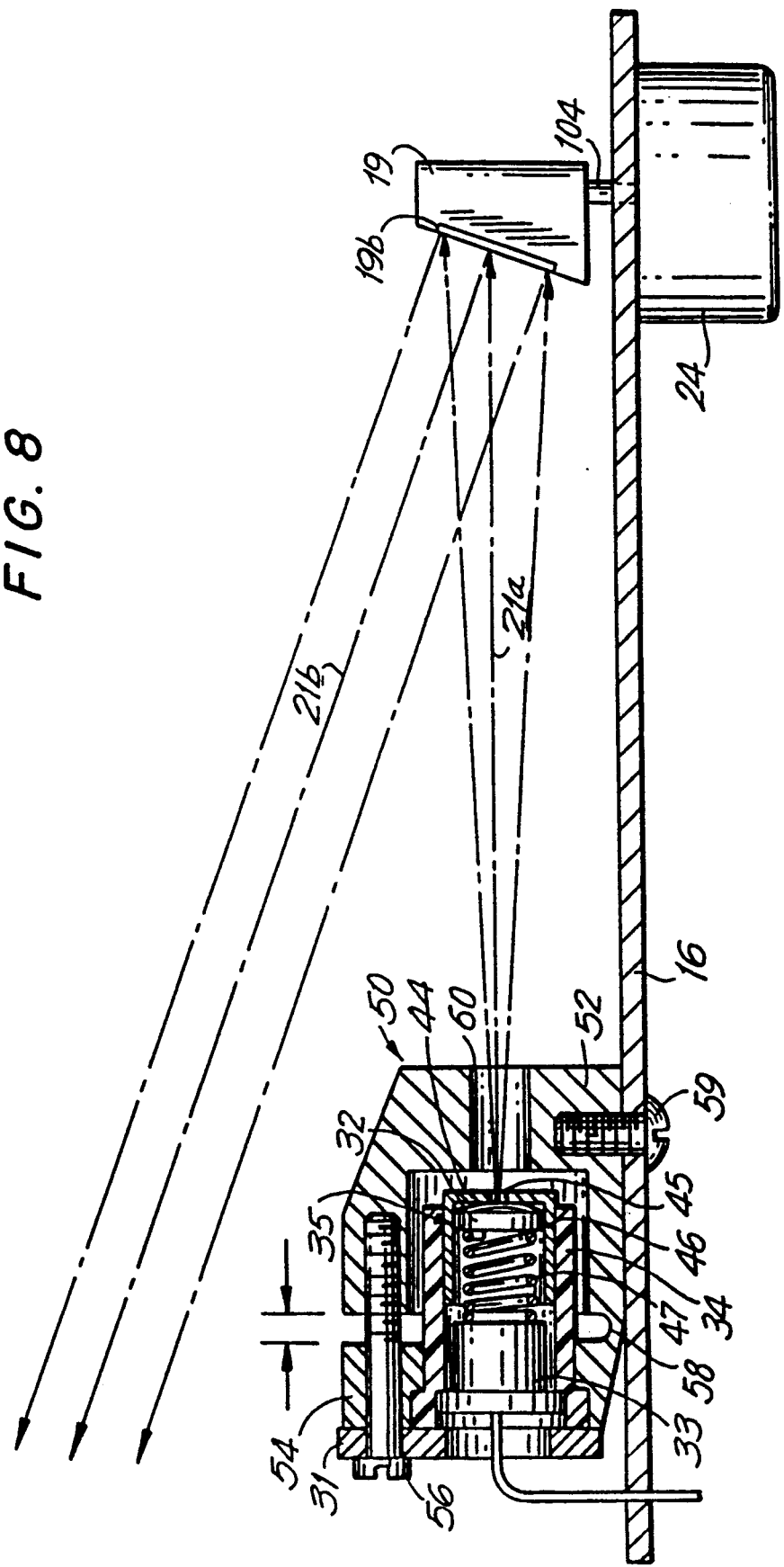

SCAN BOARD MODULE FOR LASER SCANNERS

CROSS-REFERENCE TO RELATED APPLICATION

This application is a continuation of Ser. No. 484,170, filed Feb. 23, 1990, now U.S. Pat. No. 5,015,833, which is a continuation of Ser. No. 429,198, filed Oct. 30, 1989, now abandoned, which is a continuation-in-part of U.S. application Ser. No. 265,548, filed Nov. 1, 1988, now U.S. Pat. No. 4,896,026.

BACKGROUND OF THE INVENTION

1. Field of the Invention

This invention generally relates to laser scanning systems for reading indicia having portions of different light reflectivity such as bar code symbols and, more particularly, to a lightweight, multi-component, compact, scan board module for use in such systems.

2. Description of Related Art

Various optical readers and optical scanning systems have been developed heretofore to optically read bar code symbols printed on labels affixed to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. Such readers and systems electro-optically decoded the coded patterns to a multiple alpha-numerical digit representation descriptive of the object. Scanning systems of this general type, and components for use in such systems, have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248 and 4,806,742; as well as in U.S. patent application Ser. Nos. 196,021; 7,775; 944,848; 138,563; 148,669; 148,555; 147,708; and 193,265; all of which have been assigned to the same assignee as the instant application and are incorporated herein to show the state of the art.

As disclosed in some of the above patents and applications, a particularly advantageous embodiment of such a scanning system resided, inter alia, in optically modifying and directing a laser light beam from a hand-held head which was supported by a user; aiming the head and, in some cases, the laser beam itself at a symbol to be read; repetitively scanning the laser beam and/or the field of view of a detector across the symbol; detecting the laser light reflected off the symbol during scanning; and decoding the detected reflected light.

Another advantageous embodiment resided in mounting at least some, if not all, of the system components in a stand-alone, portable workstation supported on a countertop or like surface.

Hand-held heads and workstations typically, but not necessarily, had different housings with shapes dictated by the particular application. A gun- or flashlight-shaped housing was more suitable for some hand-held applications, whereas a box- or bell-shaped housing was more suitable for some workstation applications. In any event, each differently configured housing dictated how and which system components were mounted therein. Heretofore, such system components had been mounted on rigid support plates, brackets, optical benches, a plurality of printed circuit boards and combinations thereof. Each housing, therefore, had its own customdesigned layout of system components, which was wasteful and inefficient of engineering design time and manpower.

Another drawback of known hand-held systems involved maintaining the components in the head in an optically aligned relationship even after the head was dropped and subjected to shock. Various shock mounts have heretofore been proposed, but a problem exists when a single printed circuit board is used as an alignment fixture inside the head, because this type of board is typically thin and flexes when subjected to shock. Such flexing disturbs the optical alignment of components associated with the board.

SUMMARY OF THE INVENTION

1. Objects of the Invention

It is a general object of this invention to overcome the aforementioned problems and drawbacks of known prior art laser scanning systems.

An additional object of this invention is to mount electro-optical components of such systems on a single printed circuit board to constitute a compact scan board which can be mounted in housings of different shapes.

Another object of this invention is to shock mount the heaviest system components in a housing at approximately their centers of mass.

Still another object of this invention is to prevent a printed circuit board used for alignment purposes from flexing and disturbing the optical alignment when subjected to shock.

Yet another object of this invention is to provide a single, compact scan board mountable in variously configured housings and connectable to a remote terminal to constitute an intelligent terminal.

2. Features of the Invention

In keeping with these objects, and others which will become apparent hereinafter, one feature of this invention resides, briefly stated, in a laser scanning system for reading indicia having portions of different light reflectivity, e.g. a bar code symbol having alternating darker bars separated by lighter spaces of variable widths. The system includes a housing, and a light source means therein for generating an incident laser beam. Advantageously, the light source means comprises a semiconductor laser diode which emits laser light at a wavelength of about 670 to about 680 nm so that the emitted laser light is at least marginally visible to the human eye.

Optic means are also provided in the housing, and are operative for optically forming and directing the incident laser beam along an optical path toward the symbol located within a range of working distances relative to the housing. Laser light is reflected off the symbol. At least a returning portion of the reflected light travels away from the symbol back toward the housing.

Scanning means, e.g. a scanning motor, having a reciprocally-oscillatable output shaft on which a reflecting surface such as a scanning mirror is mounted, are mounted in the head for scanning the symbol in a scan, and preferably at a plurality of sweeps per second across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The system also comprises sensor means, e.g. one or more photodiodes, for detecting the variable light intensity of the returning portion of the reflected laser light over a field of view, and for generating an electrical signal, typically an analog signal, indicative of the detected variable light intensity.

Signal processing means are provided for processing the analog electrical signal, and usually for processing the same to a digitized electrical signal which can be decoded to data descriptive of the symbol being scanned.

The scanning means is operative for scanning either the incident laser beam itself across the symbol, or the field of view of the sensor means, or both.

Decode/control electronic circuitry is sometimes, but not always, provided on-board the housing, but may also be located remotely therefrom. Such circuitry is operative for decoding the digitized signal to the aforementioned data, for determining a successful decoding of the symbol, and for terminating the reading of the symbol upon the determination of the successful decoding thereof. The reading is initiated by actuation of an actuator, typically a manually-actuatable trigger means provided on the housing, and operatively connected to, and operative for actuating, the light source means, the scanning means, the sensor means, the signal processing means, and the decode/control means. The trigger means is actuated once for each symbol, each symbol in its respective turn.

In a hand-held application, the housing, also called a laser scanning head, is supported by a user in his or her hand, is aimed at each symbol to be read and, once the symbol is located, the user actuates the trigger means to initiate the reading. The decode/control means automatically alerts the user when the symbol has been read so that the user can turn his or her attention to the next symbol, and repeat the reading procedure.

One feature of this invention resides in mounting the light source means, the optical means, the scanning means, the sensor means, and the signal processing means on a single, thin, printed circuit board to constitute a compact scan board or module which can be mounted in housings of various shapes depending upon the particular application. The scan board serves as an optical alignment fixture.

Another feature of this invention is embodied in preventing the optical alignment fixture from flexing when subjected to external forces of the type encountered when a hand-held head is dropped on the ground. The laser diode, optical means, sensor means, and a heat sink for the diode together comprise an optical assembly having a center of mass. The scanning motor is part of a scanning assembly which likewise has a center of mass. Optical alignment between the optical and scanning assemblies is provided by the thin printed circuit board supported by, and extending between, the assemblies. Because of the thin and relatively flexible nature of this board, two pairs of shock mounts are provided for shock-mounting the assemblies relative to the head. Each pair of shock mounts is aligned along an axis which extends generally through a respective center of the mass of a respective assembly. By directly shock-mounting the assemblies to the head through their respective centers of mass, their heaviest components, e.g. the scanning motor and the heat sink, will not tend to rotate about the respective axes along which each pair of shock mounts is aligned. The housing will not twist, and the printed circuit board will not flex, thereby reliably ensuring that the assemblies are retained in optical alignment.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 2 is a vertical sectional view taken on line 2—2 of FIG. 1;

FIG. 3 is a plan sectional view taken on line 3—3 of FIG. 2;

FIG. 6 is a top plan view of part of the optical assembly of FIG. 3;

FIG. 7 is a side view of the optical assembly of FIG. 6;

FIG. 8 is an enlarged sectional view of the optical assembly of FIG. 3;

FIG. 9 is an enlarged sectional view taken on line 9—9 of FIG. 2;

DETAILED DESCRIPTION OF THE PREFERRED EMBODIMENTS

Figure 1:
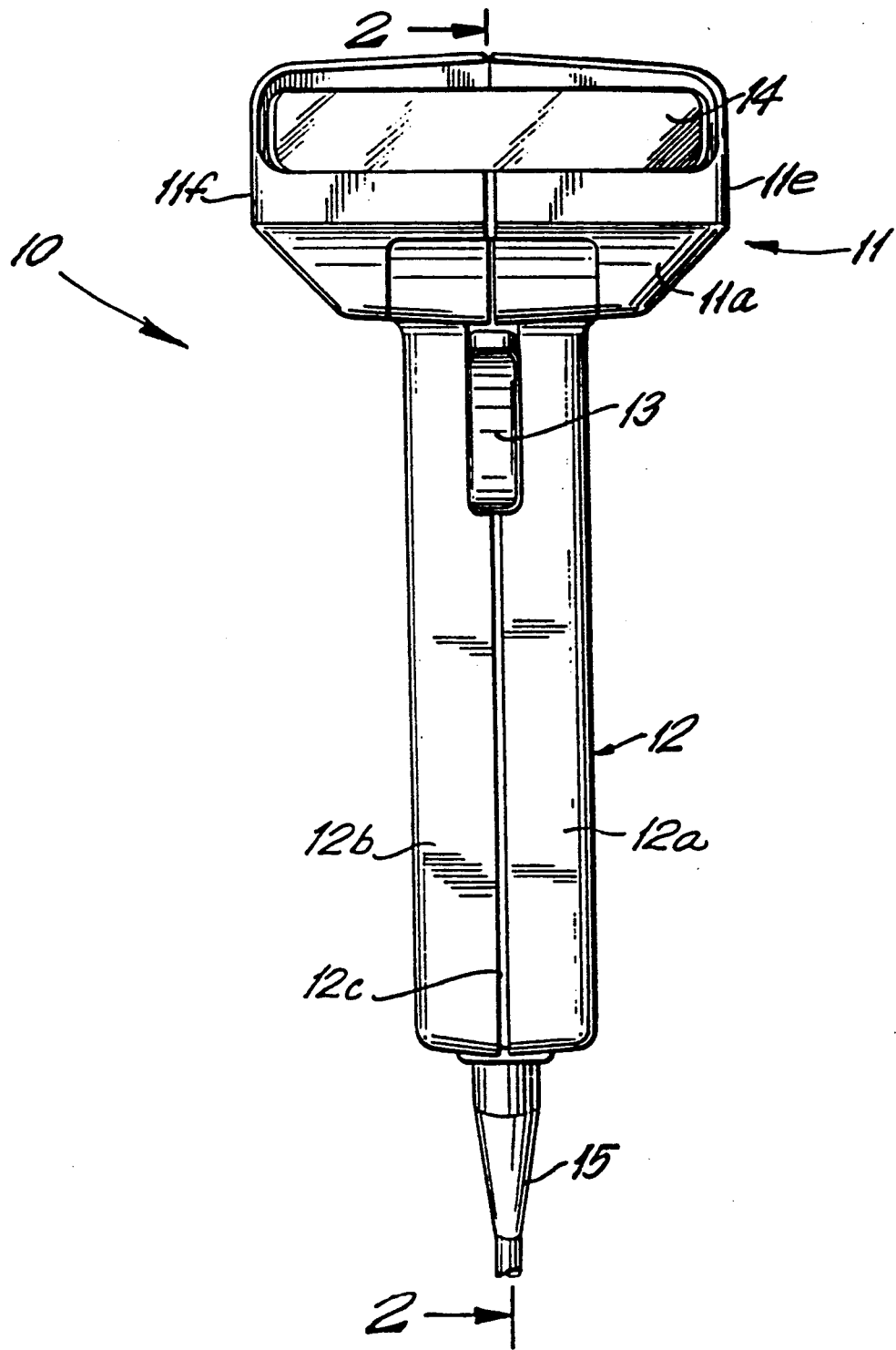
FIG. 1 is a front view of a laser scanning head according to this invention.

Referring now to FIGS. 1-4 of the drawings, reference numeral 10 generally identifies a lightweight (less than one pound), streamlined, hand-held, fullyportable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the omnipresent Universal Product Code (UPC) symbol, or any of the black and white industrial symbols, e.g. Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the head 10 includes a generally gun-shaped housing having a handle portion 12 of generally rectangular cross-section and generally eongated along a handle axis, and a generally horizontallyelongated barrel or body portion 11. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10. The shell is formed of two housing parts 12a, 12b meeting along a generally vertical joining line 12c.

Figure 4:
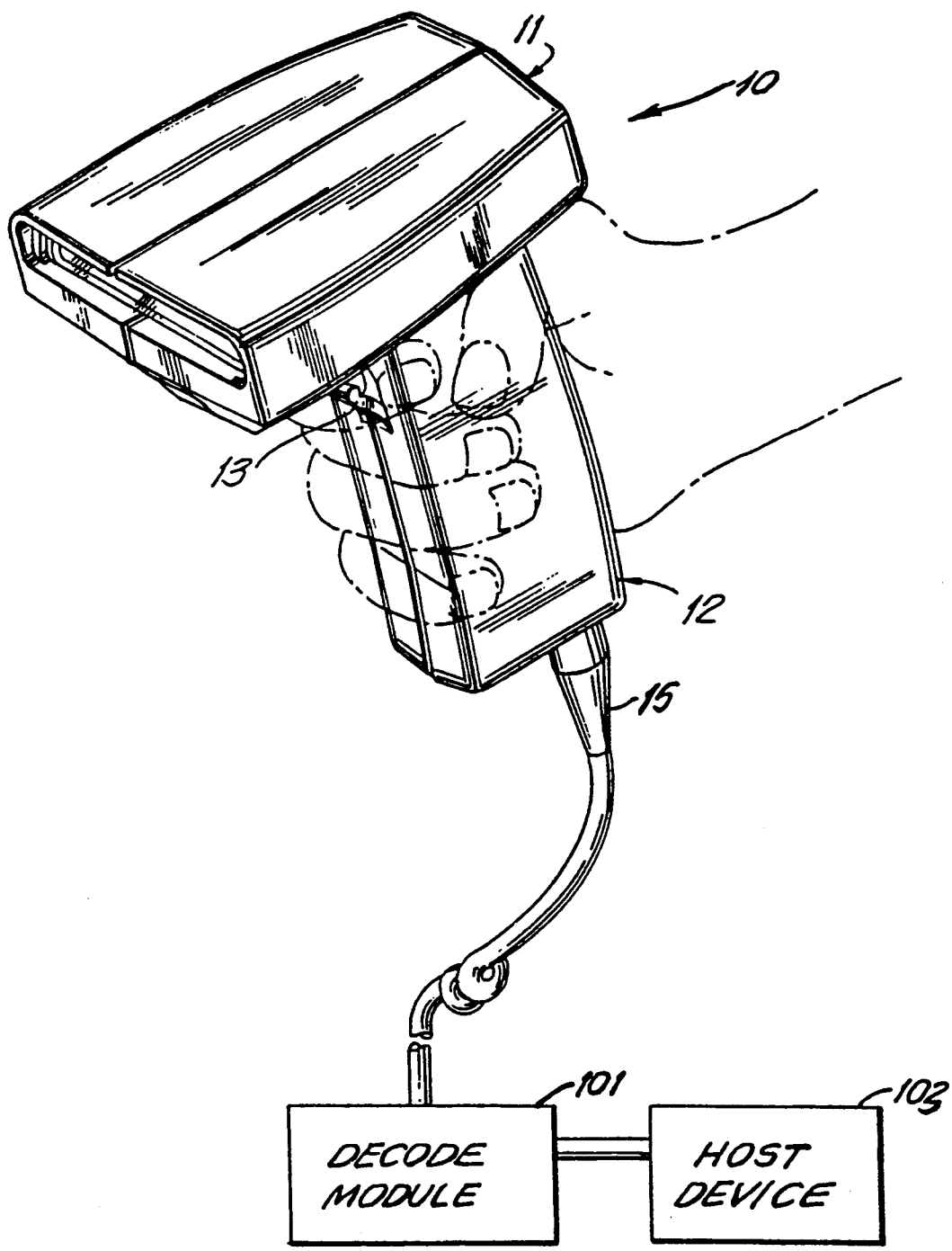
FIG. 4 is a front perspective view of the head of FIG. 1 in use, and schematically connected to other components of a laser scanning system.

As considered in an intended position of use as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the head in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, whose operation is explained in greater detail below.

A plurality of components are mounted in the head and, as explained below, at least some of them are actuated by the trigger 13, either directly or indirectly, by means of a control microprocessor. One of the head components is an actuatable laser light source (see FIGS. 3 and 4), e.g. a semiconductor laser diode 33, operative, when actuated by the trigger 13, for propagating and generating an incident laser beam whose light, as explained above, is at least marginally visible to the human eye. The wavelength of the emitted beam is in the range from about 670 nm to about 680 nm. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a re-chargeable battery pack accessory detachably mounted on the head, or by a power conductor in the cable 15 connected to the head from an external power supply (e.g. DC source). Diodes which emit laser light of different wavelengths are also within the scope of this invention.

As best shown in FIG. 8, an optical assembly 30 is mounted in the head on a thin, flexible, printed circuit board 16 and adjustably positioned relative to the same for optically modifying and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol to be read is located in the vicinity of the reference plane, either at, or at one side, or at an opposite side, of the reference plane; that is, anywhere within the depth of field of the optically modified laser beam and within a range of working distances as measured relative to the head. The laser beam reflects off the symbol as a specular component in one direction and as a scattered component in many directions, and that portion of the scattered laser light which travels along a second optical path 21c and 21b away from the symbol back toward the head is known herein as the returning portion which, of course, also is at least marginally visible to the user.

As best shown in FIG. 8, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 is mounted for longitudinal movement. The lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative (with the stop) for focusing the emitted laser beam at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved. The side wall portions are initially received in a threaded or sliding relationship with an inner circumferential wall bounding the optical tube, and are thereupon fixed, e.g. by glueing or clamping, to the inner circumferential wall when a desired longitudinal spacing between the lens and the aperture stop on the one hand, and the diode on the other hand, has been obtained. The longitudinal movement between the side wall portions and the inner circumferential wall of the tube constitutes an adjustable positioning means for the lens and the aperture stop, and the fixing in position of the lens and the aperture stop relative to the diode constitutes a means for fixedly locating the lens and the aperture stop at a predetermined spacing from the diode.

The aperture stop has a cross-section which is, as explained below, about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence angle of the laser beam to transmit more energy to the symbol.

The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

Figure 5:
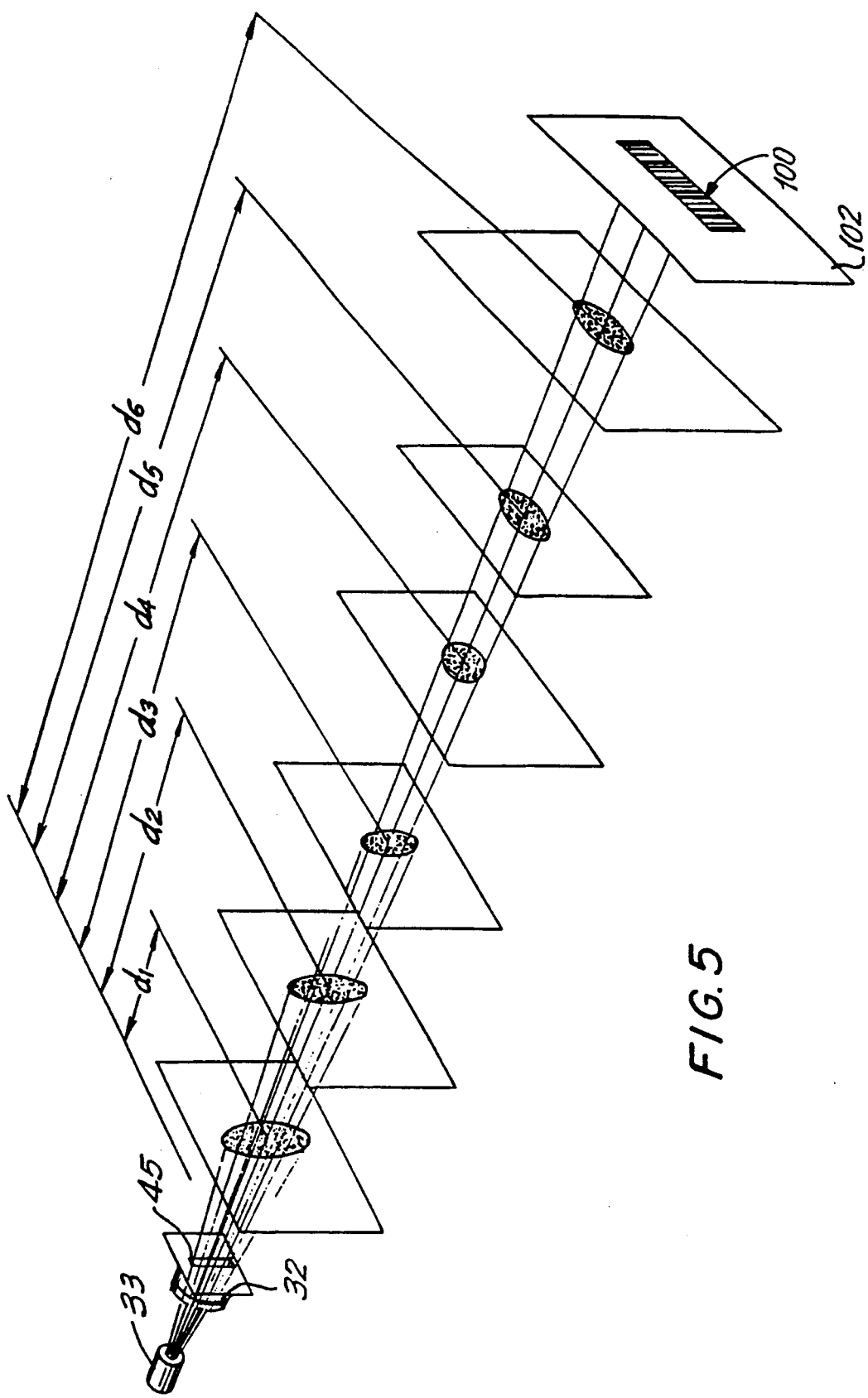
FIG. 5 is a perspective view depicting various cross-sections of the laser beam emitted by the head of FIG. 1.

The laser beam that passes through the passage 60 is directed rearwardly by the optical assembly along path 21a within the head to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, a representative symbol 100 in the vicinity of the reference plane 102 is shown and, in the case of a bar code symbol, is comprised of a series of vertical bars spaced apart of one another along a longitudinal direction. A laser beam spot is focused on the symbol. When the scanning mirror is, as explained below, reciprocally and repetitively oscillated transversely to sweep the laser beam lengthwise across all the bars of the symbol, a linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,397, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360°, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32° and at a rate of about 20 scans or 40 oscillations per second.

Referring again to FIG. 2, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity of the collected laser light over a field of view which extends along, and preferably beyond, the linear scan, and generates an electrical analog signal indicative of the detected variable light intensity.

The photosensor "sees" a collection zone on the symbol. The aforementioned angular adjustment means ensures that the emitted laser beam impinges on the symbol at the collection zone when the laser spot impinges on the symbol.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, silvered concave mirror. The concave collecting mirror serves to collect the returning portion of the laser light and to focus the same on the photodiode.

Also mounted in the head are various electrical subcircuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for converting the incoming voltage to one suitable for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored decoded signals thereupon can be unloaded to a remote host computer. By providing the local data storage means, the use of the cable during the reading of the symbols can be eliminated—a feature which is very desirable in making the head as freely manipulatable as possible. A beeper 28 is also optionally mounted on board 27 so that the user can hear through a port 29 in the handle when a symbol has been successfully read.

The assembly at the forward end of the board 16, including the optical block 50, the heat sink 31, the laser diode 33 and its associated optics, together with the photodetector 17, has a center of mass which approximately extends along an axis which is co-linear with an axis along which front shock mounts 23b, 23d extend (see FIG. 2). The assembly at the rear end of the board 16, including the scanning motor 24, the collecting and scanning mirrors on bracket 19, the arm 20, the diode 22a and receiver 22b also has a center of mass which approximately extends along an axis which is co-linear with an axis along which rear shock mounts 23a, 23c extend. By so positioning the heaviest components in the head, namely, the heat sink and the scanning motor, on, or close to, these shock mounting axes, the tendency of the heat sink and the scanning motor to turn around the shock mounting axes is minimized, thereby resisting the tendency of the head from twisting and the tendency of the optical and scanning assemblies from moving out of optical alignment in the event that the head is dropped.

Figure 10:
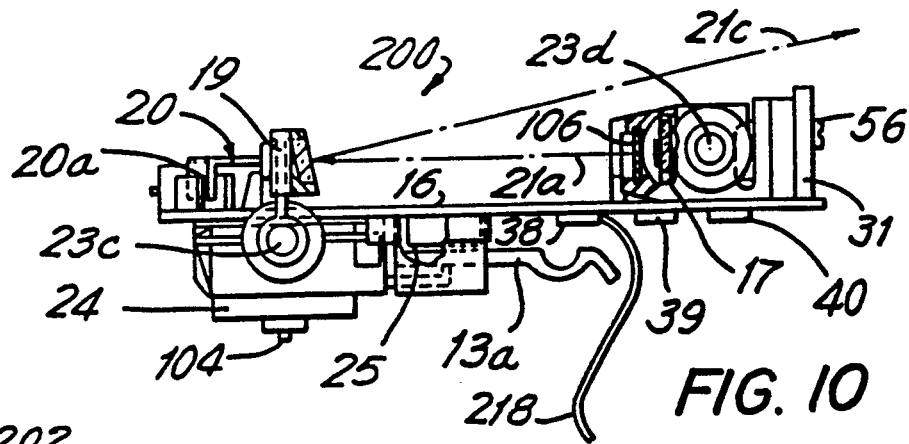
FIG. 10 is a side view of a scan board according to this invention.

FIG. 10 shows the printed circuit board 16 and the aforementioned light source means, optic means, scanning means, sensor means and analog-to-digital signal processing means mounted thereon and together constituting a scan board or module 200 mountable as a single unit into housings of virtually any shape, e.g. the handheld, gun-shaped head 10 shown in FIG. 4. By eliminating the trigger arm 13a and trigger switch 25, the resulting module can be mounted in workstations such as the housings 202 and 226 shown in FIGS. 10 and 11, respectively. A flat ribbon cable 218 conducts electrical signals to and away from the electrical components on the board 16.

Figure 11:
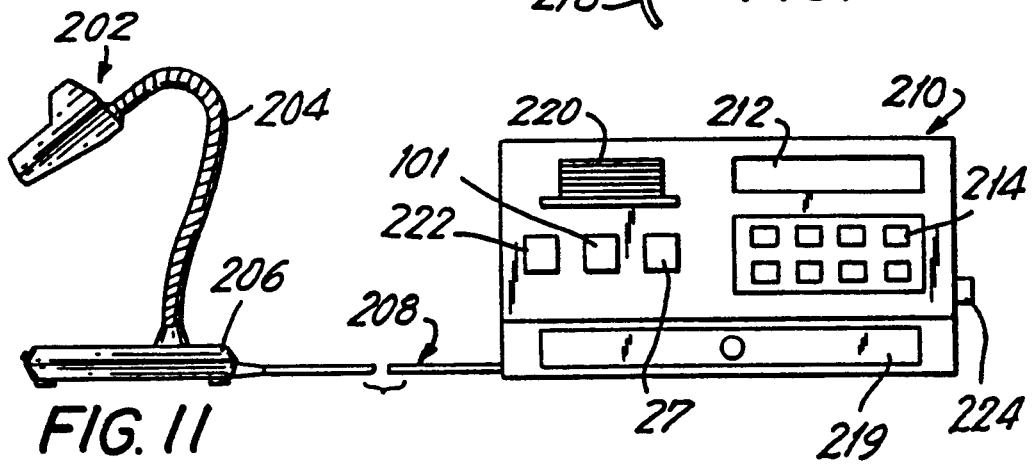
FIG. 11 is a side view of one embodiment of an integrated terminal according to this invention.

The housing 202 is mounted at one end of a semi-rigid, bendable, shape-retaining arm 204 whose opposite end is connected to a base 206 mounted on a support surface, such as a countertop, to constitute a portable, stand-alone workstation. The decode module 101 can be mounted inside base 206. The cable 218 is routed through the interior of arm 204. An electrical cable 208 connects the base 206 to a cash register-type terminal 210 having a display 212 for displaying information, including data descriptive of the symbol being scanned, to an operator, a keyboard 214 for enabling the operator to manually enter information, including data descriptive of the symbol being scanned; a cash drawer 219 for holding money, a paper tape 220 for recording information and providing a receipt to a customer of the purchase of an object bearing the symbol being scanned; a recharger 222 for recharging and supplying electrical power to a battery mounted either within the base 206 or the head 202; the decode module 101 (in case the decode module is not located within the base 206 or head 202): and local data storage means 27 (in case the local data storage means is not located within the base 206 or head 202). The data stored within terminal 210 can be unloaded via connector 224 to the host computer 103. The entire installation shown in FIG. 11 is known as an integrated terminal. The arm 204 can be manipulated with multiple degrees of freedom of movement to insure that the exiting laser beam strikes the symbol and/or the returning reflected light is collected from the symbol.

Figure 12:
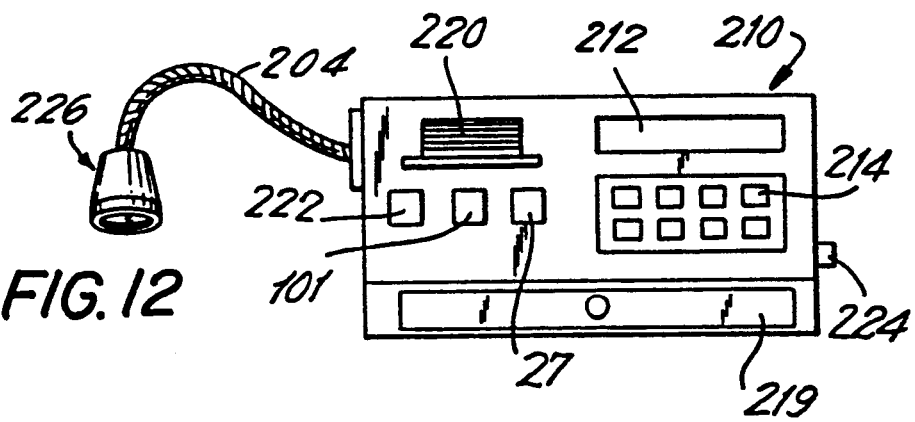
FIG. 12 is a side view of another embodiment of an integrated terminal according to this invention.

The integrated terminal shown in FIG. 12 has the same register 210. The housing 226 has a bell- or lamp-like shape. The arm 204 has its opposite end not connected to any base, but, instead, directly connected to the register 210. The integrated terminal of FIG. 12 is intended as a permanent scanning installation.

The laser scanning heads of FIGS. 2, 11 and 12 are of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

Each head may further include deactivation apparatus for changing the state of a surveillance device associated with a tag or label on which the symbol is provided, such as described in U.S. Ser. No. 236,249, assigned to the assignee of the instant application. The terminal need not be a cash register, but may be a hand-held box.

Figure 13:
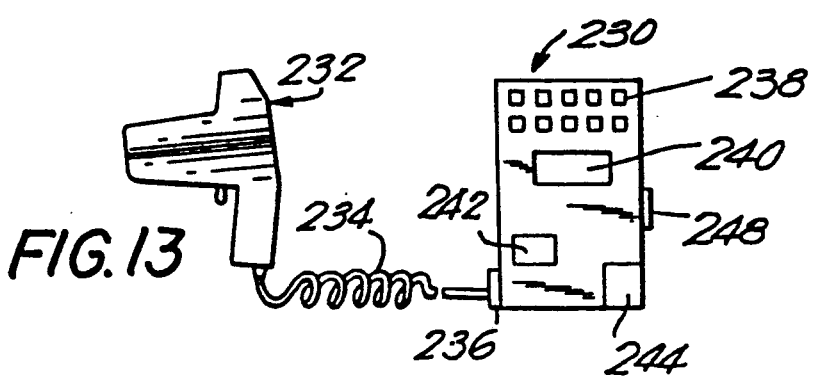
FIG. 13 is a side view of yet another embodiment of an integrated terminal according to this invention.

Thus, as shown in FIG. 13, terminal 230 is sized to fit in the palm of one's hand, and is operatively connected to a hand-held head 232 in which the scan module 200 is mounted. The conductor means 218 is routed through a cable 234 having one end connected to the head, and an opposite end detachably connected at connector 236 to terminal 230. The terminal 230 has a keyboard 238 for entering data and/or control functions, a display 240 for displaying data read by the head 232 or entered via the keyboard 238, a local data storage 242 for storing the data read by the head 232 or entered via the keyboard 238, a recharger 244 with battery backup, and a data transfer connector 248 for downloading the data in storage 242 to a host computer.

It will be understood that each of the elements described above, or two or more together, also may find a useful application in other types of constructions differing from the types described above.

While the invention has been illustrated and described as embodied in a scan board module for laser scanners it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and rang of equivalence of the following claims.

What is claimed as new and desired to be protected by Letters Patent is set forth in the appended claims.

We claim:

1. A scan module for use in light scanning systems for reading indicia having portions of different light reflectivity, comprising:
   (a) a generally planar, printed circuit board having front and rear regions spaced longitudinally apart of each other;
   (b) light source means at the front region, for generating and directing a light beam toward the rear region along a first optical path;
   (c) a movable scanning mirror at the rear region in the first optical path, said scanning mirror having a reflecting surface inclined relative to the board for reflecting the light beam toward the front region along a second optical path to the indicia for reflection therefrom, said second optical path passing above the light source means and being angularly offset from the first optical path as considered in a vertical plane generally normal to the board;
   (d) sensor means at the front region, for receiving light reflected from the indicia; and
   (e) a movable collecting mirror at the rear region in the second optical path, said collecting mirror having a collecting surface for collecting the reflected light from the indicia traveling along the second optical path and passing above the sensor means, and for directing the collected reflected light to the sensor means along a third optical path that is angularly offset from the first optical path as considered in a horizontal plane generally parallel to the board.

2. The scan module as recited in claim 1, wherein the board has a centerline, and wherein the light source means and the scanning mirror are centrally mounted on the board on the centerline.

3. The scan module as recited in claim 2, wherein the sensor means is mounted on the board away from the centerline.

4. The scan module as recited in claim 2, wherein the light source means includes a laser diode and an optical assembly arranged in an optically-aligned relationship along the first optical path.

5. The scan module as recited in claim 1, wherein the reflecting surface of the scanning mirror is generally planar and is mounted to form an obtuse angle with the plane in which the board lies.

6. The scan module as recited in claim 1, wherein the collecting surface of the collecting mirror is generally concave and is centered on the second optical path.

7. The scan module as recited in claim 1, wherein the scanning and collecting mirrors are mounted together for joint oscillating movement about an axis that extends generally normally of the board.

8. The scan module as recited in claim 1, wherein the board is a thin, flexible substrate.

9. The scan module as recited in claim 1; and further comprising a drive mounted at the rear region of the board, and operatively coupled to the scanning and collecting mirrors to move the mirrors to effect scanning of the indicia.

10. The scan module as recited in claim 9, wherein the drive includes a reciprocally-oscillatable motor mounted on a lower surface of the board, and a drive shaft extending through the board to an upper surface of the board, and wherein the light source means, sensor means, scanning mirror and collecting mirror are mounted at the upper surface of the board.

11. The scan module as recited in claim 1; and further comprising an electrical cable mounted on the board, for conducting electrical signals to and away from the board.

12. A system for reading indicia having portions of different light reflectivity, comprising:
   (a) a housing having an exit port and an interior;
   (b) a generally planar, printed circuit board mounted in the interior of the housing and having front and rear regions spaced longitudinally apart of each other;
   (c) light source means at the front region, for generating and directing a light beam toward the rear region along a first optical path;
   (d) a movable scanning mirror at the rear region in the first optical path, said scanning mirror having a reflecting surface inclined relative to the board for reflecting the light beam toward the front region along a second optical path through the exit port to the indicia for reflection therefrom, said second optical path passing above the light source means and being angularly offset from the first optical path as considered in a vertical plane generally normal to the board;
   (e) sensor means at the front region, for receiving light reflected from the indicia through the exit port; and
   (f) a movable collecting mirror at the rear region in the second optical path, said collecting mirror having a collecting surface for collecting the reflected light from the indicia traveling along the second optical path through the exit port and passing above the sensor means, and for directing the collected reflected light to the sensor means along a third optical path that is angularly offset from the first optical path as considered in a horizontal plane generally parallel to the board.

13. The system as recited in claim 12, wherein the board has a centerline, and wherein the light source means and the scanning mirror are centrally mounted on the board on the centerline.

14. The system as recited in claim 13, wherein the sensor means is mounted on the board away from the centerline.

15. The system as recited in claim 12, wherein the reflecting surface of the scanning mirror is generally planar and is mounted to form an obtuse angle with the plane in which the board lies.

16. The system as recited in claim 12, wherein the collecting surface of the collecting mirror is generally concave and is centered on the second optical path.

17. The system as recited in claim 12; and further comprising a drive mounted at the rear region of the board, and operatively coupled to the scanning and collecting mirrors to move the mirrors to effect scanning of the indicia.

18. The system as recited in claim 17, wherein the drive includes a reciprocally-oscillatable motor mounted on a lower surface of the board, and a drive shaft extending through the board to an upper surface of the board, and wherein the light source means, sensor means, scanning mirror and collecting mirror are mounted at the upper surface of the board.

19. The system as recited in claim 12; and further comprising a terminal operatively connected to the housing, said terminal including display means for displaying data descriptive of the indicia being read, and keyboard means for enabling an operator to enter information relating to the indicia being read, and data storage means for storing the data descriptive of the indicia being read.

20. The system as recited in claim 12, wherein the housing has a handle for hand-held operation.

21. A method of reading indicia having portions of different light reflectivity, comprising the steps of:

(a) mounting a generally planar printed circuit board having front and rear regions within a housing having an exit port;

(b) mounting a light source means at the front region of the board, for generating and directing a light beam toward the rear region along a first optical path;

(c) mounting a movable scanning mirror at the rear region in the first optical path, and inclining a reflecting surface of the scanning mirror relative to the board for reflecting the light beam toward the front region along a second optical path through the exit port to the indicia for reflection therefrom, said second optical path passing above the light source means and being angularly offset from the first optical path as considered in a vertical plane generally normal to the board;

(d) mounting sensor means at the front region of the board, for receiving light reflected off the indicia through the exit port; and (e) mounting a movable collecting mirror at the rear region in the second optical path, and positioning a collecting surface of the collecting mirror for collecting the reflected light from the indicia traveling along the second optical path through the exit port and passing above the sensor means, said collecting surface directing the collected reflected light to the sensor means along a third optical path that is angularly offset from the first optical path as considered in a horizontal plane generally parallel to the board.

* * * * *